Figure 1:
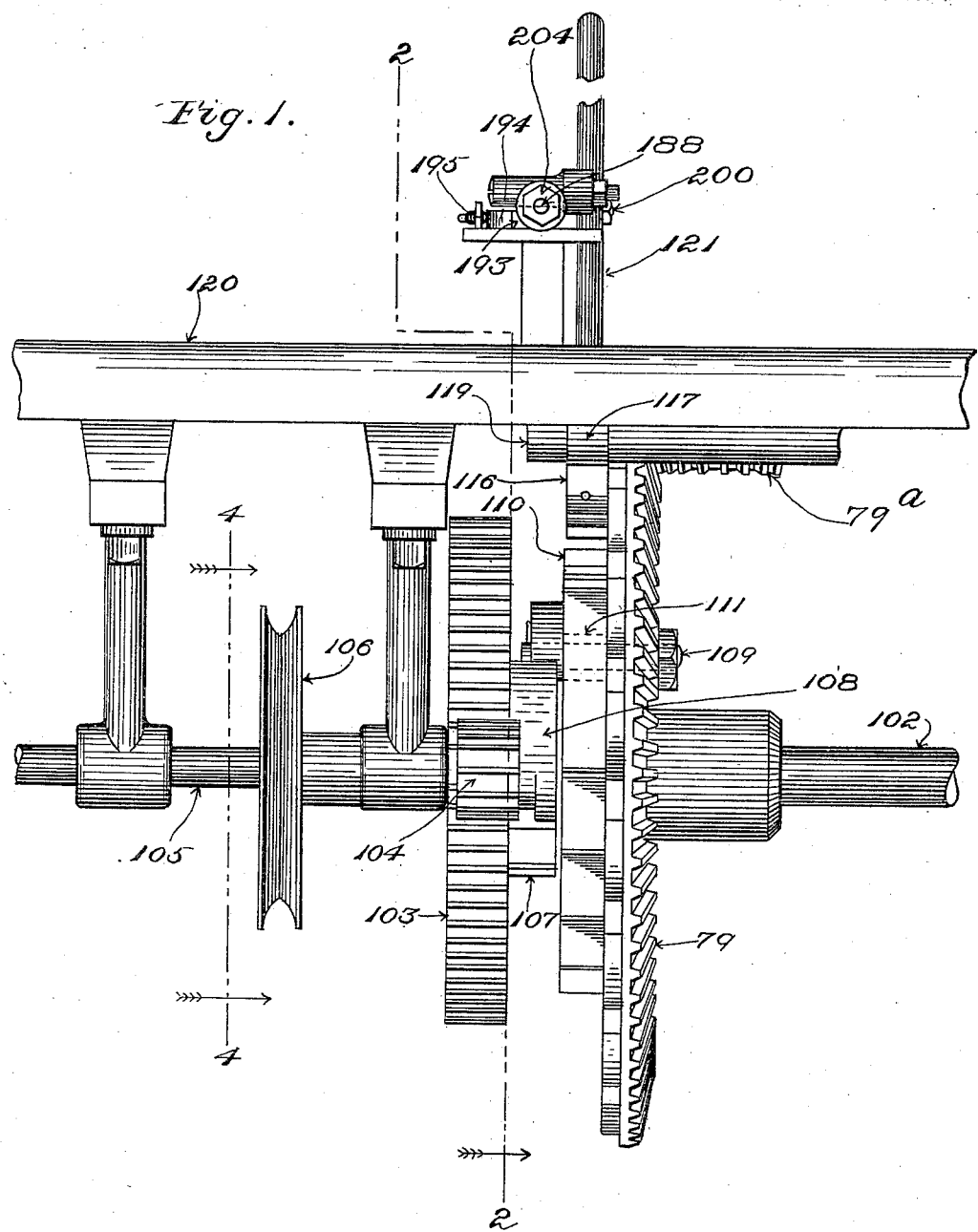

No. 699,379. Patented May 6, 1902.
J. FRENCH.
CLUTCH AND STOP MECHANISM.
(Application filed July 10, 1901.)
(No Model.) 3 Sheets—Sheet 1.

Witnesses:
Oscar F. Hill
Arthur O. Randall

Inventor:
Joseph French
by Macleod Calvert & Randall
Attorneys.

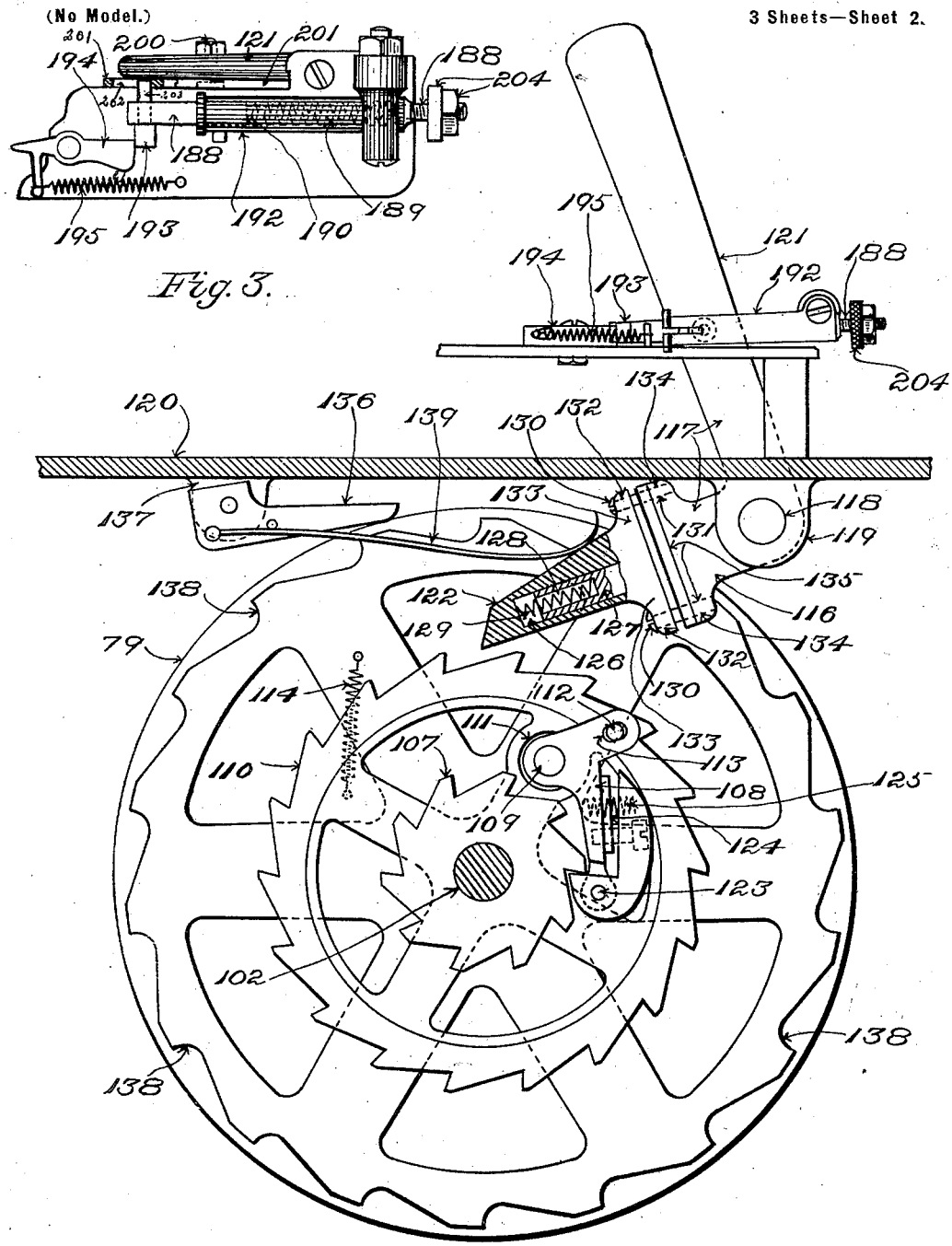

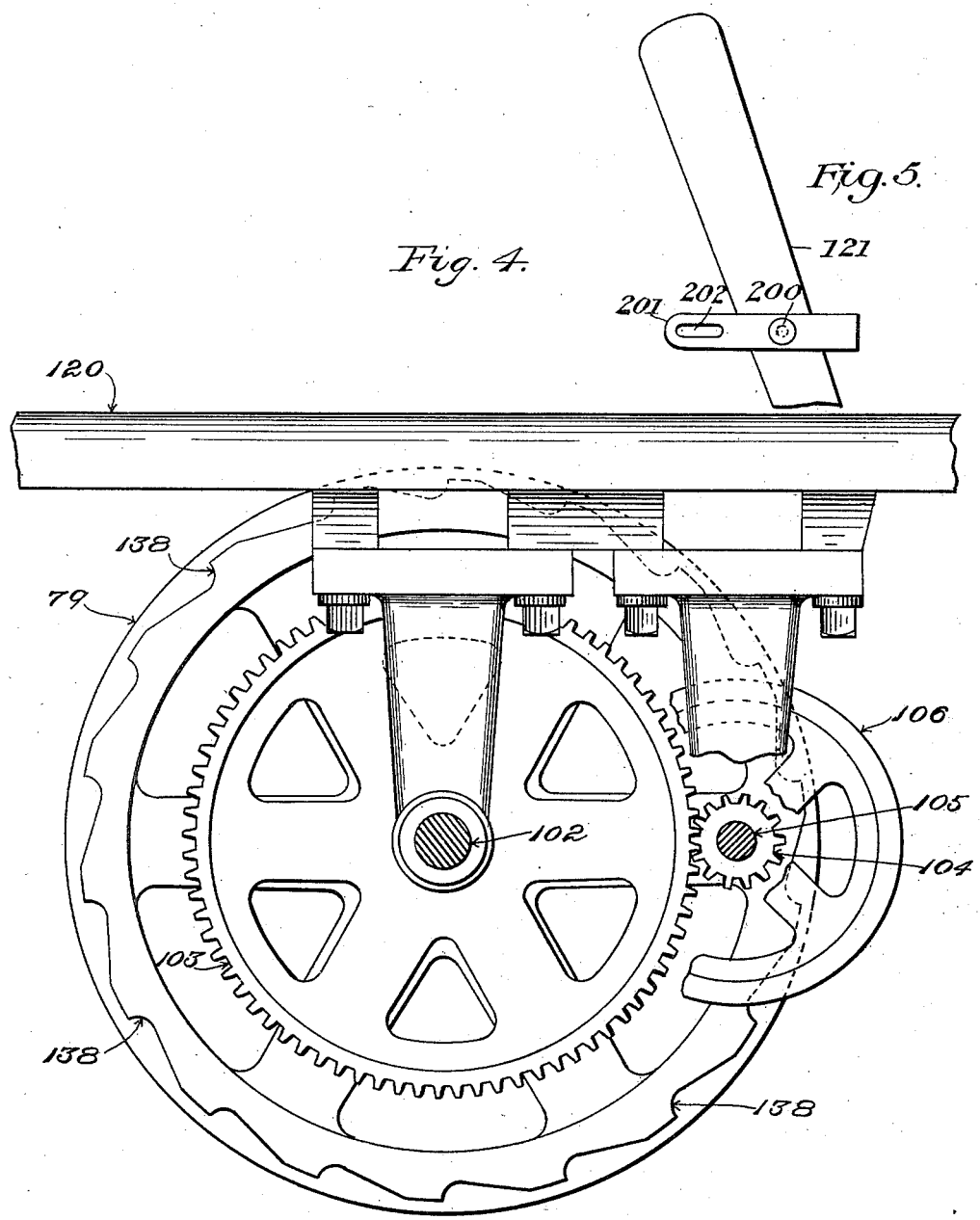

UNITED STATES PATENT OFFICE.

JOSEPH FRENCH, OF WOONSOCKET, RHODE ISLAND.

CLUTCH AND STOP MECHANISM.

SPECIFICATION forming part of Letters Patent No. 699,379, dated May 6, 1902.

Application filed July 10, 1901. Serial No. 67,721. (No model.)

*To all whom it may concern:*

Be it known that I, JOSEPH FRENCH, a citizen of the United States, residing at Woonsocket, in the county of Providence, State of Rhode Island, have invented a certain new and useful Improvement in Clutch and Stop Mechanisms, of which the following is a specification, reference being had therein to the accompanying drawings.

I have shown in the accompanying drawings the best form in which I have thus far embodied the invention.

In the drawings, Figure 1 shows the said embodiment in elevation. Fig. 2 is a view in vertical section along the dotted line 2 2, Fig. 1, looking in the direction indicated by the arrows adjacent the ends of such line. Fig. 3 is a detail plan view. Fig. 4 is a view partly in vertical section along the dotted line 4 4, Fig. 1, looking in the direction indicated by the arrows adjacent the ends of such line. Fig. 5 is a detail view of the handle 121 and the slotted link which is pivoted thereto.

102 is a shaft in connection with which my invention is shown applied.

103 is a wheel capable of revolving independently of shaft 102 and constituting the rotary driver, from which the motion of shaft 102 is derived. Wheel 103 or its equivalent may be actuated in any convenient and approved manner in practice. It is herein represented as mounted loosely on shaft 102. I have shown driving arrangements for communicating continuous rotary movement to the said wheel 103, such arrangements comprising a pinion 104 on a short shaft 105 and a band-pulley 106, fast on the said short shaft 105. For the purpose of connecting said gear 103 with the part which is to be driven and disconnecting it therefrom as and when required I employ a clutch comprising a small ratchet or detent wheel 107, which is fast with the large gear 103, so that it turns in unison with the latter, and a pivoted dog or catch 108, which is connected to the part which is to be driven. In the present instance the pivotal mounting of the said dog or catch 108 is by means of a pin or stud 109, projecting laterally from one of the arms of the large bevel-gear 79 on the shaft 102. Bevel-gear 79 may be loose upon shaft 102, or it may be keyed or otherwise made fast thereon if said shaft is desired to be driven. In the present instance for convenience bevel-gear 79 is supposed to be fast upon shaft 102. It is also supposed to be utilized in transmitting driving power to machinery to be actuated, as in consequence of its engagement with a bevel-pinion 79ª, which is shown in part in Fig. 1. If the said dog or catch 108 is in engagement with one of the teeth of the small ratchet-wheel 107, rotation of the latter will communicate rotation to the shaft 102 in unison therewith.

In connection with the dog or catch 108 I employ a controller therefor by means of which to determine or occasion and discontinue the engagement of the said dog or catch 108 with the small ratchet-wheel 107. This controller comprises in the present instance a toothed or ratchet wheel 110, rotating in unison with the large bevel gear-wheel 79, but capable of a certain amount of independent movement relatively to the latter. The said controller or ratchet wheel 110 is here shown as having a hole through one of its arms, (indicated at 111 in Fig. 2,) and through this hole 111 passes loosely the pin or stud 109, above referred to, which serves as the pivot of the dog or catch 108. The dog or catch 108 is in loose engagement with the controller-wheel 110. I have shown in Fig. 2 a pin or stud 112 projecting from one side of the controller-wheel 110 and working in a slot 113 in an outwardly-extending arm of the dog or catch 108. It will be perceived that if independent movement of the controller-wheel 110 relatively to the large bevel gear-wheel 79 be occasioned the working of the pin or stud 112, carried by the controller-wheel 110, within the slot 113 of the dog or catch 108 will cause the said dog or catch to turn around its pivot 109. A tension-spring 114 is joined at one extremity thereof to an arm of the large bevel gear-wheel 79 and at the other extremity thereof to the controller-wheel 110. This spring 114 acts with a tendency to move the controller 110 relatively to the large bevel gear-wheel 79 in a direction to throw the engaging end of the dog or catch 108 into engagement with a tooth of the small ratchet-wheel 107. Thereby the said dog or catch 108 is caused to assume a position in which it will engage with a tooth of the said ratchet-wheel, and thus the said small ratchet-wheel is connected with the shaft 102, so as to transmit movement to the latter. Backward movement of the controller-wheel 110 relative to the large bevel gear-wheel 79 through a short distance will cause the engaging portion of the dog or catch 108 to be swung out of engagement with the small ratchet-wheel 107 in an obvious manner.
It will be clear from the foregoing that the tension-spring 114 acts through the controller-wheel 110 with a tendency to move the dog or catch 108 so as to cause it to engage with one of the teeth of the small ratchet-wheel 107 and that hence whenever the said tension-spring is free to act it will effectuate the clutching of the driving power to the shaft 102.

For the purpose of occasioning the disengaging movement of the controller-wheel 110 and dog or catch 108 I provide a movable stop, which in one position thereof stands in the path of rotation of a projecting part or tooth of the controller-wheel 110, so as in the rotation of the shaft 102 and the parts connected therewith to detain the said controller-wheel 110—that is to say, arrest its movement—while the other parts continue to rotate. Such a stop is shown herein as comprising a stop-dog 122, Fig. 2, on an arm 116, forming part of a rocker 117, which is journaled in bearings 118, that are provided in lugs or ears 119 on the under side of the table 120, the said rocker being furnished with an upwardly-extending arm or shipper-handle 121, by means of which the rocker 117 and stop-dog may be moved by hand when required. Movement of the rocker 117 in one direction will place the stop-dog in position to engage with one of the projections or teeth of the controller-wheel 110, and movement of the rocker 117 in the other direction will shift the stop-dog out of the path of rotation of the said projections or teeth. I have herein shown the controller-wheel 110 as formed with a series of ratchet-teeth at the periphery thereof, the stop-dog being shaped like an ordinary dog or pawl for engagement with the said ratchet-wheel.

In order to obviate hammering and shock when the dog or catch 108 is caused to engage with the small ratchet-gear 107 and when the stop-dog 122 is caused to engage with the controller-wheel 110, I cushion the parts, as I will now proceed to explain.
As shown most clearly in Fig. 2, the engaging portion of the dog or catch 108 is formed separate from the body or main part of the dog or catch and is movably applied thereto, a cushion being provided against which the movable part brings up after being engaged with a tooth of the small ratchet-wheel 107. Herein the said movable engaging portion is shown connected with the main part of the dog or catch 108 by a pivot 123, and at 124 is shown an elastic cushion, which is applied to one of the parts, herein the main portion or body of the dog or catch 108, in position to receive the pressure of the tail of the engaging portion as the said engaging portion is swung about its pivot 123 by the strain which is transmitted thereto by the tooth on the ratchet-wheel 107, which takes against the said engaging portion. A comparatively weak expansion-spring 125, interposed between the tail of the engaging portion and the body or main part of the dog or catch 108, serves to hold the said tail separated normally from the other part. In like manner the engaging portion of the stop-dog 122 is movable relatively to the rocker-arm 116, to which it is applied. (See Fig. 2.) It is shown herein as formed with a central longitudinal socket 126, receiving a pin or stud 127, projecting from the rocker-arm 116, the outer end of the said pin or stud being bored to form a cavity or chamber 128, which receives an expansion spiral spring 129, one end of which bears against the inner end or bottom of the said cavity or chamber 128 in the pin or stud 127, while the other takes bearing against the inner end of the central longitudinal chamber 126 of the stop-dog 122. This spring 129 acts with a tendency to move the stop-dog 122 longitudinally outward upon the pin or stud 127, the limit of the movement in this direction being determined by the heads of the screws 130 130. The stems 131 131 of these screws 130 pass through holes 132 132 in ears 133 133, with which the inner end of the stop-dog 122 is provided, their threaded portions being fitted to threaded holes in the rocker-arm 116. At 135 is represented a cushion that is interposed between the proximate faces of the stop-dog 122 and rocker-arm 116. This cushion, as well as that designated 124 and applied between the parts of the dog or catch 108, consists of thin blocks or layers of india-rubber. The object in view of employing the expansion-spring 129 between the stop-dog 122 and the rocker-arm 116 and the like expansion-spring 125 between the two members of the dog or catch 108 is to enable the meeting faces of the respective parts to make contact lightly with each other before the effective resistance to the relative movement of the parts which is offered by the cushions begins to be felt. In this way hammering and shock are obviated.

The devices which have just been described operate to disconnect the driving power quickly and to instantly arrest the working of the machinery without shock or jar. At the speed at which the machinery is run in practice there is a tendency to recoil. To prevent recoil, I provide a recoil-dog 136, which is pivoted to a depending ear or lug 137 on the table 120 of the machine, and I provide in connection with the bevel-gear 79 or shaft 102 a series of projections or teeth for engagement with the said recoil-dog. Thus I have herein shown the large bevel gear-wheel 79 as provided adjacent the periphery thereof with a series of teeth 138, which are shaped, as shown, to coöperate with the engaging end of the said recoil-dog 136. It is intended that in the recoil of the parts following after the engagement of the stop-dog 122 with a tooth of the controller-wheel 110 the recoil-dog 136 shall take against one of the teeth on the large bevel-gear 79, and thus hold the main shaft 102 from any appreciable extent of retrograde movement or recoil. It is undesirable that the recoil-dog 136 should be permitted to rest normally against the teeth 138 of the bevel-gear 79 on account of the noise which would result therefrom in the running of the machine. I therefore preferably employ means of holding the said recoil-dog normally out of the path of rotation of the said teeth and of shifting it into the said path at the moment, or substantially the moment, of bringing about the action of the stop-dog 122. Thus I have herein shown a finger 139 interposed between the stop-dog 122 and the recoil-dog 136, by means of which the stop-dog 122 when placed in its uplifted position is instrumental in holding the recoil-dog 136 in an abnormal uplifted position free from contact with the teeth of the large bevel gear-wheel 79. When the stop-dog 122 is moved into position to engage with the controller-wheel 110, it allows the recoil-dog 136 to move into position for engagement with the said teeth. It happens sometimes that after the machine has been brought to rest the recoil-dog 136 is held so firmly by the pressure of one of the teeth of the large bevel gear-wheel 79 against the engaging portion of the said recoil-dog 136 that considerable force is required to be exerted in order to move the said recoil-dog 136 back into its inoperative position. This would render it difficult to move the stop-dog 122 into its inoperative position by hand, and therefore I render the said finger 139 yielding by forming it as a flat spring attached to the recoil-dog 136 and projecting into position to be engaged by the stop-dog 122.

In practice the arrangements for controlling and operating rocker 117 will vary according to the exigencies of use. Herein I have represented the same having connected therewith by a pivot 200 a small link 201, having therein a longitudinal slot 202, receiving a pin 203, projecting laterally from the spring-actuated bolt 188, the said pin usually for convenience being formed as the stem of the engaging block 193. Bolt 188 works in a case 192, the stem of the said bolt being surrounded by an expansion spiral spring 189, which is compressed between a shoulder 190 on the bolt 188 and the opposite end of the case 192. The block 193, carried by the inner end of bolt 188, is engaged by a latch 194, which is shown best in Fig. 3, said latch having connected therewith a tension-spring 195, operating to hold the same normally in engagement with the block 193. The engagement of latch 194 with the said head serves to hold the bolt 188 in a retracted position, with spring 189 compressed, and the engagement of pin 203 with the right-hand end of slot 202 in link 201 acts to hold the handle 121, rocker 117, and stop-dog 122 in the positions represented in Fig. 2, with the said stop-dog elevated above the path of rotation of the teeth of controller-wheel 110. When the latch is disengaged from the block 193, the bolt 188 is released and is projected toward the left, which renders the rocker and stop-dog free to descend under the influence of gravity, or the influence of gravity may be assisted by the engagement of pin 203 with the left-hand end of slot 201, so as to place stop-dog 122 within the path of rotation of the teeth of controller-wheel 110. In some cases spring 189 may be omitted. The purpose of slot 202 in the link 201 is to enable the handle or controller-lever 121 to be moved by hand independently of bolt 188 when required—as, for instance, when it is desired to disengage stop-dog 122 from the teeth of controller-wheel 110 temporarily without pushing bolt 188 back and reëngaging it with the latch 194. The extent of the inward movement of the spring-actuated bolt 188 is limited by nuts 204, applied to the threaded outer end of said bolt.

What I claim is—

1. In combination, a rotatable carrier having the dog pivotally connected therewith, the toothed wheel engaged by the said dog, a controller-wheel also connected with said dog, a spring operating to cause said dog to engage with said toothed wheel, and means to act upon said controller-wheel to effect the disengagement of said dog from said toothed wheel, substantially as described.

2. In combination, a rotatable carrier having the dog pivotally connected therewith, the toothed wheel engaged by the said dog, the controller-wheel operatively connected with the said dog, the spring operating to cause said dog to engage with said toothed wheel, and the stop-dog to arrest the rotation of said controller-wheel and thereby occasion the disengagement of said dog from said toothed wheel, substantially as described.

3. In combination, a rotatable carrier, the dog pivotally mounted upon said carrier, the engaging portion movably applied to the main part of the dog, the yielding cushion between said main part and said engaging portion, the toothed wheel engaged by said engaging portion, a controller-wheel also connected with the dog, a spring operating to cause the dog to be moved to place its engaging portion in engagement with the toothed wheel, and means to act upon said controller-wheel to effect the disengagement of said dog from said toothed wheel, substantially as described.

4. In combination, a rotatable carrier, the dog pivotally mounted upon said carrier, the engaging portion movably applied to the main part of the dog, the yielding cushion between said main part and said engaging portion, the toothed wheel engaged by said engaging portion, a controller-wheel also connected with the dog, a spring operating to cause the dog to be moved to place its engaging portion in engagement with the toothed wheel, and the stop-dog to arrest the rotation of said controller-wheel and thereby occasion the disengagement of said dog from said toothed wheel, substantially as described.

5. In combination, the rotatable carrier having the dog pivotally connected therewith, the toothed wheel engaged by the said dog, the controller-wheel operatively connected with the said dog, the spring operating to cause said dog to engage with said toothed wheel, the stop-dog to arrest the rotation of said controller-wheel and thereby occasion the disengagement of said dog from said toothed wheel, and a movable support for said stop-dog on which it is independently movable, and a yielding cushion for said stop-dog, substantially as described.

6. In combination, a rotatable carrier, the dog pivotally mounted upon said carrier, the engaging portion movably applied to the main part of the dog, the yielding cushion between said main part and said engaging portion, the toothed wheel engaged by said engaging portion, a controller-wheel also connected with the dog, a spring operating to cause the dog to be moved to place its engaging portion in engagement with the toothed wheel, the stop-dog to arrest the rotation of said controller-wheel and thereby occasion the disengagement of said dog from said toothed wheel, and a movable support for said stop-dog on which it is independently movable, and a yielding cushion for said stop-dog, substantially as described.

7. In combination, a rotatable carrier having the dog pivotally connected therewith, the toothed wheel engaged by the said dog, the controller-wheel operatively connected with the said dog, the spring operating to cause said dog to engage with said toothed wheel, the stop-dog to arrest the rotation of said controller-wheel and thereby occasion the disengagement of said dog from said toothed wheel, and the recoil-dog whereby recoil of the parts is prevented, substantially as described.

8. In combination, a rotatable carrier having the dog pivotally connected therewith, the toothed wheel engaged by the said dog, the controller-wheel operatively connected with the said dog, the spring operating to cause said dog to engage with said toothed wheel, the stop-dog to arrest the rotation of said controller-wheel and thereby occasion the disengagement of said dog from said toothed wheel, and the recoil-dog under control of said stop-dog, whereby when said stop-dog is caused to act the said recoil-dog is brought into action also, substantially as described.

9. In combination, a rotatable carrier having the dog pivotally connected therewith, the toothed wheel engaged by the said dog, the controller-wheel operatively connected with the said dog, the spring operating to cause said dog to engage with said toothed wheel, the stop-dog to arrest the rotation of said controller-wheel and thereby occasion the disengagement of said dog from said toothed wheel, the recoil-dog, and the yielding connection between the recoil-dog and the stop-dog, substantially as described.

10. In combination, a rotatable carrier having the dog pivotally connected therewith, the toothed wheel engaged by the said dog, the controller-wheel operatively connected with the said dog, the spring operating to cause said dog to engage with said toothed wheel, the stop-dog to arrest the rotation of said controller-wheel and thereby occasion the disengagement of said dog from said ratchet-wheel, a movable support for said stop-dog on which it is independently movable, and a yielding cushion for said stop-dog, the recoil-dog, and the yielding connection between the recoil-dog and the stop-dog, substantially as described.

11. In combination, a rotatable carrier, the dog pivotally mounted upon said carrier, the engaging portion movably applied to the main part of the dog, the yielding cushion between said main part and said engaging portion, the toothed wheel engaged by said engaging portion, a controller-wheel also connected with the dog, a spring operating to cause the dog to be moved to place its engaging portion in engagement with the toothed wheel, the stop-dog to arrest the rotation of said controller-wheel and thereby occasion the disengagement of said dog from said toothed wheel, and a movable support for said stop-dog on which it is independently movable, and a yielding cushion for said stop-dog, the recoil-dog, and the yielding connection between the recoil-dog and the stop-dog, substantially as described.

In testimony whereof I affix my signature in presence of two witnesses.

JOSEPH FRENCH.

Witnesses:
CHAS. F. RANDALL,
WILLIAM A. COPELAND.